US008533099B2

(12) United States Patent
Devers et al.

(10) Patent No.: US 8,533,099 B2
(45) Date of Patent: Sep. 10, 2013

(54) SYSTEM AND METHOD FOR ELECTRONICALLY TRADING DERIVATIVES AND OTHER FINANCIAL INSTRUMENTS

(75) Inventors: Brian Devers, Lumberton, NJ (US); James W. Toffey, Summit, NJ (US)

(73) Assignee: Tradeweb Markets LLC, New York, NY (US)

( * ) Notice: Subject to any disclaimer, the term of this patent is extended or adjusted under 35 U.S.C. 154(b) by 908 days.

(21) Appl. No.: 12/485,701

(22) Filed: Jun. 16, 2009

(65) Prior Publication Data
US 2010/0125519 A1 May 20, 2010

Related U.S. Application Data

(60) Provisional application No. 61/061,923, filed on Jun. 16, 2008.

(51) Int. Cl.
*G06Q 40/00* (2012.01)
(52) U.S. Cl.
USPC .......................................................... 705/37
(58) Field of Classification Search
USPC .......................................................... 705/37
See application file for complete search history.

(56) References Cited

U.S. PATENT DOCUMENTS

| | | | | |
|---|---|---|---|---|
| 7,308,428 B1* | 12/2007 | Federspiel et al. | .......... | 705/36 R |
| 7,693,780 B2* | 4/2010 | Stearns | ............................ | 705/37 |
| 7,756,777 B2* | 7/2010 | Toffey et al. | ..................... | 705/37 |
| 7,925,569 B2* | 4/2011 | Sinclair et al. | .................... | 705/37 |
| 2002/0120555 A1* | 8/2002 | Lerner | ............................ | 705/37 |
| 2002/0156719 A1* | 10/2002 | Finebaum et al. | .............. | 705/37 |
| 2004/0210511 A1* | 10/2004 | Waelbroeck et al. | ........... | 705/37 |
| 2005/0149428 A1* | 7/2005 | Gooch et al. | ..................... | 705/37 |
| 2005/0283422 A1* | 12/2005 | Myr | ................................ | 705/37 |
| 2008/0281750 A1* | 11/2008 | Toffey et al. | ..................... | 705/37 |

\* cited by examiner

*Primary Examiner* — Hani M Kazimi
(74) *Attorney, Agent, or Firm* — Stroock & Stroock & Lavan LLP

(57) ABSTRACT

A computerized electronic trading system and method permits a customer using a customer computer to electronically request a market from a dealer using a dealer computer for a financial instrument through a network. The centralized computer system includes one or more computers and at least one message server for communicating electronic messages between the customer computer and the dealer computer, and a database system including at least one storage device, the database system storing at least information related to a plurality of financial instruments and to a trade executed between the customer and dealer. The computerized electronic trading system is programmed with a request for market module programmed with a trade negotiation sub-component to handle the exchange of messages related to the negotiation of trades, and a trade execution module to negotiate pricing for the financial instrument, including an ability to counter a price quote for the financial instrument are transmitted through the computerized electronic trading system, and execute a trade upon agreement between the customer and the dealer on the price quote.

3 Claims, 15 Drawing Sheets

CDSINDEX TRADE   ***Non-Competitive***

Customer
Brian Devers         Sales:
TradeWeb

Request
Status:   MARKET REQUESTED(P)        NEW TRADE
Notional: 50,000 M                    Non-Comp
Issue:    IG.10 5 Yr                  Trd#  7

Your Quote
                BID              ASK
Quote  100.000        5.000       105.000
Size   100              X          100

Release              Send            Send
                     Subject         Firm Message | Info | History | PV                         Defer
Cust Msg:                                    Send
Dir Msg:

0:33
GOOD FOR
7

*Customer*
Brian Devers          Sales:
TradeWeb

*Request*
Status: Customer Counters OFFER
Notional: 100,000 M
Issue: IG.10 5 Yr

NEW TRADE - FACES CUST
Non-Comp
Trd# 11

0:07
GOOD FOR
7

*Your Quote*
TW14 Offers  100  @ 105.000
Repeat Offer: 100 MM @ 105.000

Send Subject    Send Firm    Close

Message | Info | History | PV
Cust Msg:
Dlr Msg:                    Send 800
820
822

SYSTEM AND METHOD FOR ELECTRONICALLY TRADING DERIVATIVES AND OTHER FINANCIAL INSTRUMENTS

CROSS-REFERENCE TO RELATED APPLICATIONS

This application claims priority under 35 U.S.C. §119(e) to co-pending U.S. Provisional Patent Application Ser. No. 61/061,923, filed Jun. 16, 2008, the entire disclosure of which is incorporated herein by reference.

COPYRIGHT NOTICE

A portion of the disclosure of this patent document contains material which is subject to copyright protection. The copyright owner has no objection to the facsimile reproduction by any one of the patent disclosure, as it appears in the U.S. Patent and Trademark Office patent files or records, but otherwise reserves all copyright rights whatsoever.

BACKGROUND OF THE INVENTION

1. Field of the Invention

The embodiments of the present invention relate to systems and methods for trading financial instruments and, in particular, to systems and methods for communication between customers and dealers involving customer requests for a market in a selected financial instrument.

2. Description of the Related Arts

Typically, trades are negotiated over the telephone. In such instances, a customer will call a dealer to price a particular financial instrument. In the case of some participants, such as larger hedge funds, the participant is resistant to revealing whether it is a buyer or a seller of the financial instruments (e.g., derivatives) in question. Thus, a convention has arisen in which the participant asks the dealer to "make a market" in the subject financial instrument. When a request to make a market is received, a responding dealer will typically respond with bid and ask prices representing the prices at which the dealer is willing to sell or buy the subject financial instrument. If the bid or ask price is at a level that suits the customer, the customer will verbally indicate that it will buy or sell the financial instrument at the bid or ask price, as appropriate. This verbal indication is an oral agreement to execute a trade of the subject financial instrument.

After the verbal trade, there are several confirmation and settlement steps that need to be carried out in order to finalized the trade. As a result, it is desirous to computerize some or all of the trading process, as disclosed by U.S. Pat. App. Serial No. 2004/0236668, the entire disclosure of which is incorporated herein by reference. However, in some instances, there may be technical problems in computerizing the trading process in the context of market making in the aforementioned fashion, including but not limited to a problem that is encountered when the dealer is given flexibility to customize the market being made.

Specifically, during a phone trade, a dealer always has the option to change a bid-ask price based on market conditions until the customer indicates acceptance. In order to provide a dealer with the same flexibility on an electronic trading platform, a technical problem may arise if the customer does not notice the change on the message window displaying the bid-ask price to the customer. Thus, in order to prevent a customer from unwittingly accepting an electronic trade in which the dealer has changed the bid and ask price in a manner adverse to the customer, there is a need to provide a technical solution to aid the customer and minimize customer mistakes, as well as to solve other technical problems.

SUMMARY OF THE INVENTION

The embodiments of the present invention seek to overcome the aforementioned technical problem and other problems and inefficiencies with prior art methods and systems.

In one embodiment, a computer-implemented method for trading a derivative using a computer system capable of communication with a customer computer and a plurality of dealer computers, generally comprises providing information from the computer system relating to a plurality of derivatives; causing the display on the customer computer a trade request ticket interface, the trade request ticket interface designed and configured to receive one or more inputs related to a trade request; receiving from the customer computer a trade request and an indication of at least one dealer to which the trade request is directed; transmitting the trade request to the selected at least one dealer; causing the display on the dealer computer a trade quote interface, the trade quote interface designed and configured to receive one or more inputs related to a dealer quote in response to the trade request; transmitting the trade quote to the customer computer; causing the display on the customer computer of a trade negotiation interface, the trade negotiation interface designed and configured to enable inputs related to hitting or lifting of the dealer quote and inputs countering the dealer quote. If the dealer quote is countered, transmitting a counter to the selected at least one dealer; causing the display on the dealer computer the trade quote interface in a counter state, the trade quote interface in the counter state designed and configured to enable the dealer to accept the counter, re-quote, or end the trade request; and if the dealer quote is hit or lifted by the customer or the dealer accepts the counter, executing a transaction for the derivative.

In another embodiment, A computer program product, comprising a computer usable medium having a computer readable program code embodied therein, said computer readable program code adapted to be executed to implement a method for trading a financial instrument. The method processed by the computer program product includes providing a system, wherein the system comprises distinct software modules, and wherein the distinct software modules comprise a request for market module programmed with a trade negotiation sub-component to handle the exchange of messages related to the negotiation of trades, and a trade execution module to thereby cause the display on a customer computer a trade request ticket interface. The trade request ticket interface is designed and configured to receive one or more inputs related to a trade request and transmitting the trade request to a dealer computer using the request for market module. Further, the modules cause the display on the dealer computer a trade quote interface. The trade quote interface is designed and configured to receive one or more inputs related to a dealer quote in response to the trade request and transmitting the trade quote to the customer computer to be displayed on a trade negotiation interface on the customer computer, and to enable inputs related to hitting or lifting of the dealer quote and inputs countering the dealer quote. The display, transmitting, and trade negotiation interface being processed by the trade negotiation sub-component of the request for market module. If the dealer quote is countered, then a counter is transmitted to the selected at least one dealer, and a trade quote interface in a counter state is displayed to enable the dealer to accept the counter, re-quote, or end the trade request. If the dealer quote is hit or lifted by the customer or the dealer accepts the counter, a trade may be executed using the execution module.

In yet another embodiment, a computerized electronic trading system is designed and configured to permit a customer using a customer computer to electronically request a market from a dealer using a dealer computer for a financial instrument. The computerized electronic trading system is communicatively connected to a network to be in electronic communication with the customer computer and the dealer computer. The computerized electronic trading system comprises a centralized computer system including one or more computers and including at least one message server for communicating electronic messages between the customer computer and the dealer computer, and a database system including at least one storage device, the database system storing at least information related to a plurality of financial instruments and to a trade executed between the customer and dealer. The computerized electronic trading system is programmed with a request for market module programmed with a trade negotiation sub-component to handle the exchange of messages related to the negotiation of trades, and a trade execution module. Using the trade negotiation sub-component of the request for market module, electronic messages related to a selection and pricing of the financial instrument, including an ability to counter a price quote for the financial instrument are transmitted through the computerized electronic trading system, and, using the execution module, a trade for the financial instrument is executed upon agreement between the customer and the dealer on the price quote.

Embodiments described herein refer to the pricing and trading of "derivatives" and other "financial instruments," including without limitation various types of financial instruments, such as by way of non-limiting examples, securities, equities, fixed income instruments, as well as commodity futures, and derivatives of all types.

Additional features and advantages of the present invention are described further below. This summary section is meant merely to illustrate certain features of the invention, and is not meant to limit the scope of the invention in any way. The failure to discuss a specific feature or embodiment of the invention, or the inclusion of one or more features in this summary section, should not be construed to limit the invention as claimed.

BRIEF DESCRIPTION OF THE DRAWINGS

Embodiments of the invention will be described and shown in detail by way of example with reference to the accompanying drawings in which:

FIG. 5 is a graphical interface for reviewing a quote submitted by a dealer in accordance with an embodiment of the invention;

FIG. 6 is a graphical interface for submitting a dealer quote in a request for market mode in accordance with an embodiment of the invention;

FIG. 7b is a graphical interface for acting on a dealer quote in accordance with an embodiment of the invention;

FIG. 7c is a graphical interface for displaying an executed trade in accordance with an embodiment of the invention;

FIG. 7d is a graphical interface for countering a dealer quote in accordance with an embodiment of the invention;

FIG. 8b is a graphical interface for acting on a customer counter in accordance with an embodiment of the invention;

FIG. 9 is a graphical interface for reviewing a dealer's response to a customer counter in accordance with an embodiment of the invention; and FIG. 10 is a graphical interface for displaying executed trade details in accordance with an embodiment of the invention.

DETAILED DESCRIPTION OF THE INVENTION

In accordance with various embodiments of the invention, and as shown in the FIGS., various systems and methods are disclosed which generally provide a platform for the between customers and dealers involving customer requests for a market in a selected financial instrument.

In general, a computerized electronic trading system and method permits a customer using a customer computer to electronically request a market from a dealer using a dealer computer for a financial instrument through a network. The centralized computer system includes one or more computers and at least one message server for communicating electronic messages between the customer computer and the dealer computer, and a database system including at least one storage device, the database system storing at least information related to a plurality of financial instruments and to a trade executed between the customer and dealer. The computerized electronic trading system is programmed with a request for market module programmed with a trade negotiation sub-component to handle the exchange of messages related to the negotiation of trades, and a trade execution module to negotiate pricing for the financial instrument, including an ability to counter a price quote for the financial instrument are transmitted through the computerized electronic trading system, and execute a trade upon agreement between the customer and the dealer on the price quote.

In one embodiment, a technical solution is provided in the form of an electronic trading platform 10 in which a customer, using a customer computer, can transmit a request message to a dealer computer requesting that a dealer to make a market in the selected financial instrument. Generally speaking, the electronic trading platform 10 comprises a centralized computer system 15, including one or more computers and related storage devices for receiving transmitting and storing data related to the trading of selected financial instrument.

Figure 1:
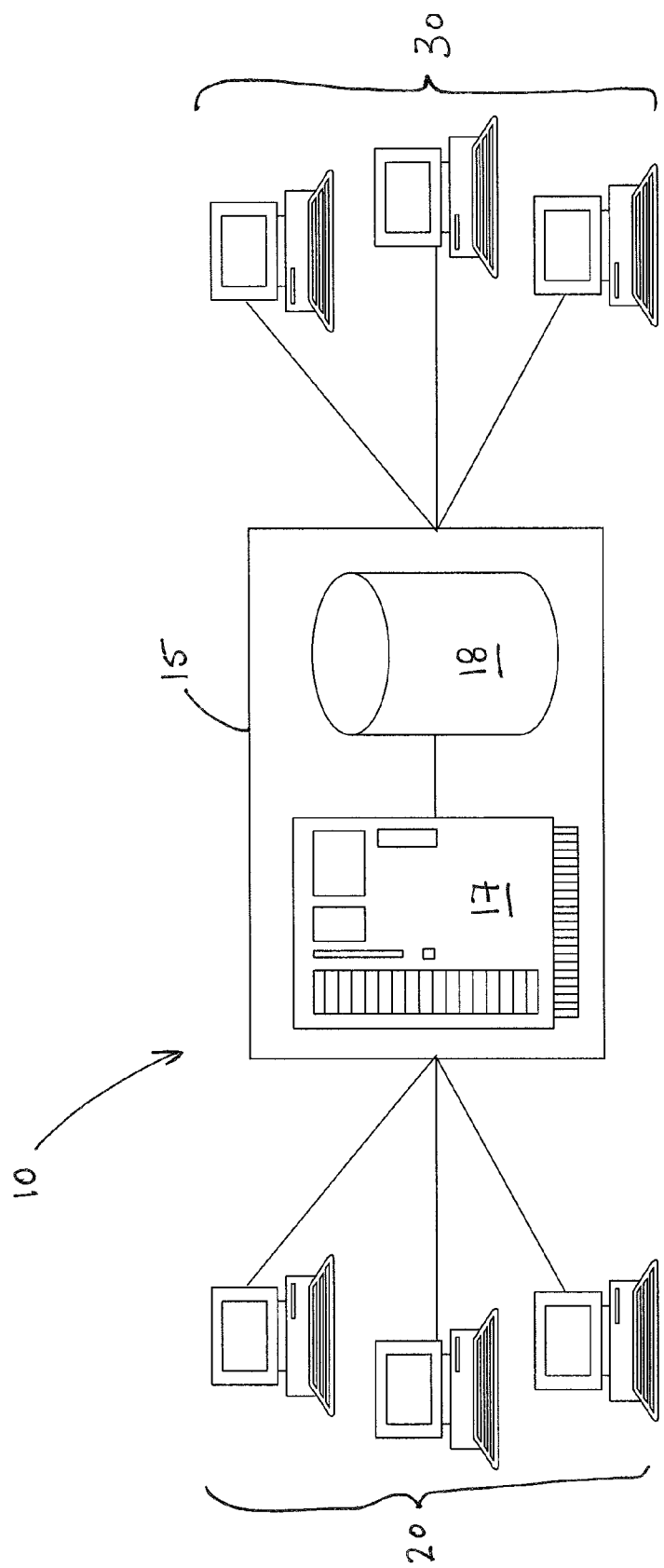
FIG. 1 is a schematic diagram of an embodiment of a system in accordance with the present invention.

With reference to FIG. 1, there is shown a preferred embodiment of a system 15, which generally comprises one or more computer systems 17 and databases 18 and related database management systems. One skilled in the art will recognize that the computer systems may as a matter of design choice include any number and configurations of computers and databases, which may be used separately or in tandem to support the traffic and processing needs necessary in operation at one time. If multiple computers are used, the computer may be configured using a round-robin configuration to handle end user traffic.

The centralized computer system 15 is communicatively interconnected to a local area network (not shown), on the one hand, and communicatively connected to a wide area network (shown generally by the interconnecting lines in FIG. 1), on the other hand, to a plurality of customer and dealer computers 20, 30. In this way, the centralized computer system 15 can receive electronic messages to and from the customer and dealer computers 20, 30 and transmit said message to the appropriate recipient. Internally, the centralized computer system 15 is interconnected in order to process and store information related to the trading of financial instruments as contemplated herein, and as further detailed below.

As noted above, one problem is that to provide proper flexibility in the trading environment, the dealer can update prices during the time period that the bid-ask prices are live and can be hit or lifted by the customer, which can cause mistakes in an electronic trading environment. If the dealer adjusts prices, then the customer GUI, shown in FIG. 3 can flash the new price. However, if the customer was not paying attention to the GUI, then the customer may miss the new price that was flashed and may not later notice that the price was changed. To address this problem, an embodiment of the present invention provides a measure of customer protection by reducing the risk that a customer will accidentally enter a trade in which the dealer has changed a component of the bid-ask price to the detriment of the customer. To accomplish this feature, the system preferably causes the trade to convert to a counter, if the customer tries to hit or lift at a price that changed adversely from the time it was sent by the dealer. Thus, for example, if the bid price is lowered, the trade ticket GUI will automatically fill the counter field with the original higher price, thereby converting the ticket to a counter and preventing the customer from accidentally executing a trade at the lower bid price. However, if the price improves in the customer's favor then the system preferably automatically re-prices the trade ticket, so as to permit the customer to take advantage of the better pricing. It should be noted that although the embodiments described herein may be used in connection with one server and one related database for performing the various functions of the trading system, other embodiments could be implemented by storing the software or programming that operates the described functions on any combination of multiple servers and databases as a matter of design choice so long as the functionality described herein is performed.

Various servers and other computer systems described herein include such art recognized components as are ordinarily found in server systems, including but not limited to processors, RAM, ROM, clocks, hardware drivers, associated storage, and the like. One skilled in the art will recognize, however, that because multiple users may be accessing such server at any given time it may become preferable to utilize multiple servers and databases, which may be used separately or in tandem to support the systems' traffic and processing, such as, by way of non-limiting example, a round-robin configuration utilizing multiple server systems. Customer and dealer computers 20, 30 can be personal computers including at least a network adapter and web browsing capability, but may also include handheld devices such as PDAs, mobile smart phones (e.g., Blackberry®, iPhone®, Treo®, and the like), or other wireless devices. Furthermore, in certain embodiments, user computers can be network systems having components such as servers, databases, etc.

In a preferred embodiment, centralized computer system 15 is programmed with computer program code comprising a plurality of programming modules and sub-components. In accordance with the present invention, in one embodiment, the centralized computer system 15 is programmed with at least a RFQ module, a RFM module, with each being programmed to include a trade negotiation sub-component to handle the exchange of messages related to the negotiation of trades, and a trade execution module.

It should be noted that although the embodiments described may use multiple software modules for performing the various functions of the system, other embodiments could be implemented using any number of modules, with any single module incorporating the functions of several, or all, of the modules. The precise design of the software and the programming language used may be designed differently within the scope of the present invention. The software modules can be created using art recognized programming languages, including but not limited to ASP, Java, C#, ASP.NET, or PHP or any combination of known programming languages that allow the functionality described.

It will also be understood that, although the various embodiments of the present invention described herein are being described in terms of web-based centralized server architecture, a thin client, fat-client, or peer-to-peer type arrangement could be substituted for the system architecture described herein and are within the scope of the present invention. Additionally, the programming described herein can be stored in a machine readable form on a computer readable medium, such as a CD-ROM or DVD, and distributed to users for installation on user computers. Alternatively, such programming can be downloaded via network. In either embodiment, communication with the system may be effected across known networks, such as the Internet.

Figure 2:
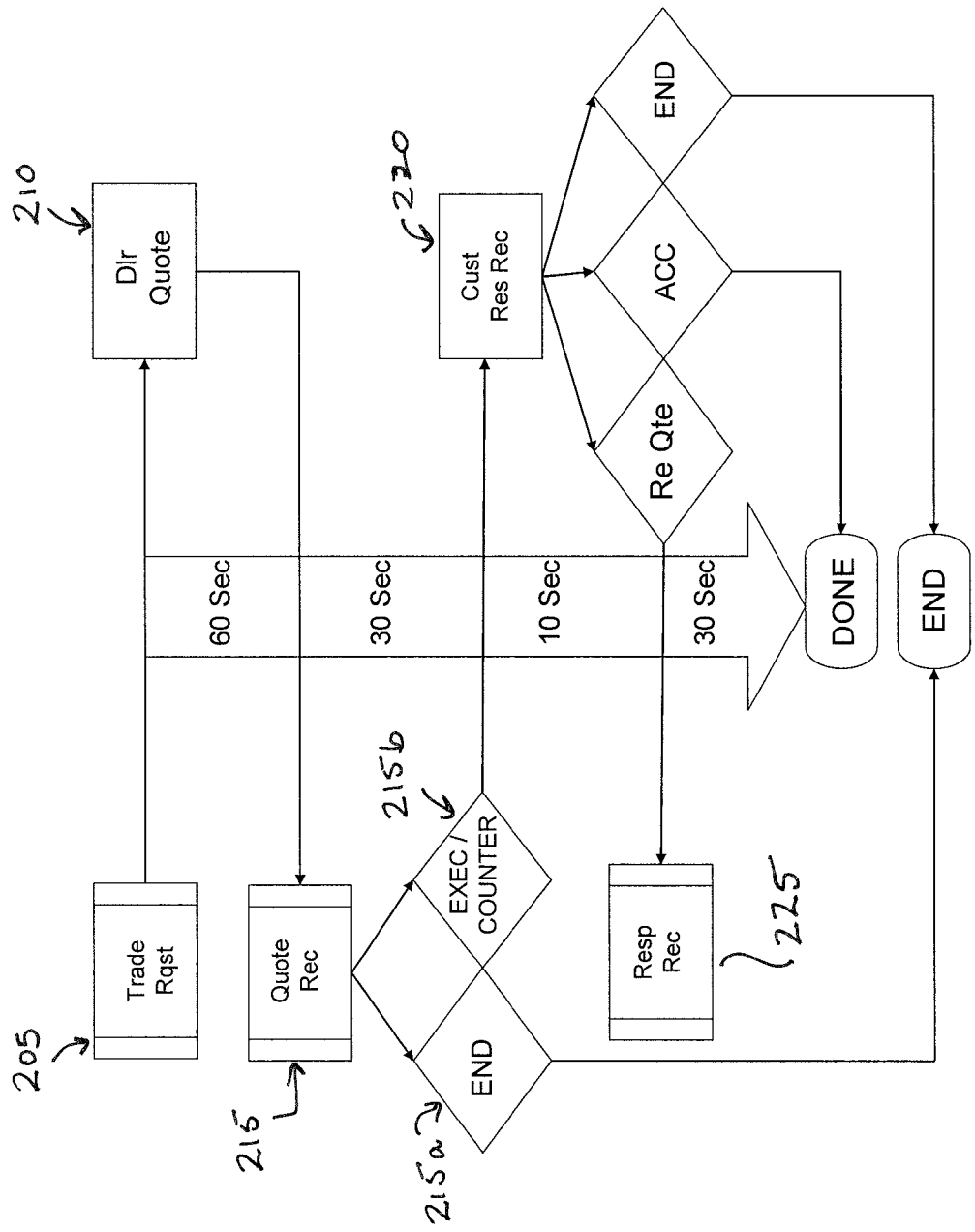
FIG. 2 is a flow diagram of an embodiment of a trade negotiation process for a financial instrument.

An overview of an embodiment of the flow of a trade request through execution is shown in the flow chart of FIG. 2. In a first step 205, a trade request is transmitted from a customer computer 20 through the electronic trading system 10 to at least one dealer computer 30. In response, in step 210, a dealer, using the dealer computer 30, can input and transmit a response in the form of a bid/ask message for the applicable financial instrument. The bid/ask message is transmitted again through the electronic trading system 10 to the customer computer 30. As further shown in FIG. 2, a preferred amount of time for the issuance of a bid/ask message is 60 seconds. In step 215, after the bid/ask message is received at the customer computer, a customer can evaluate the bid/ask message to determine whether the customer desires to hit or lift the quote to execute a trade. If the customer does not wish to execute a trade, then the process ends, in step 215a. However, if the customer desires to further the trade process, then, in step 215b, the customer will transmit an execution/counter message to the dealer. A preferred amount of time for permitting the customer to issue the response is 30 seconds. The execution/counter message is transmitted through the electronic trading system 10 to the dealer computer 30. At this point, in step 220, the dealer can either re-quote trade, accept and execute the trade or end the process. It is preferred that the dealer be given 10 seconds to complete the decision process. If the dealer re-quotes the trade, then the new quote message is transmitted through the electronic trading system 10 to the customer computer 20. The customer is preferably provided another 30 seconds to decide whether to execute the trade, in a step 225.

Figure 3:
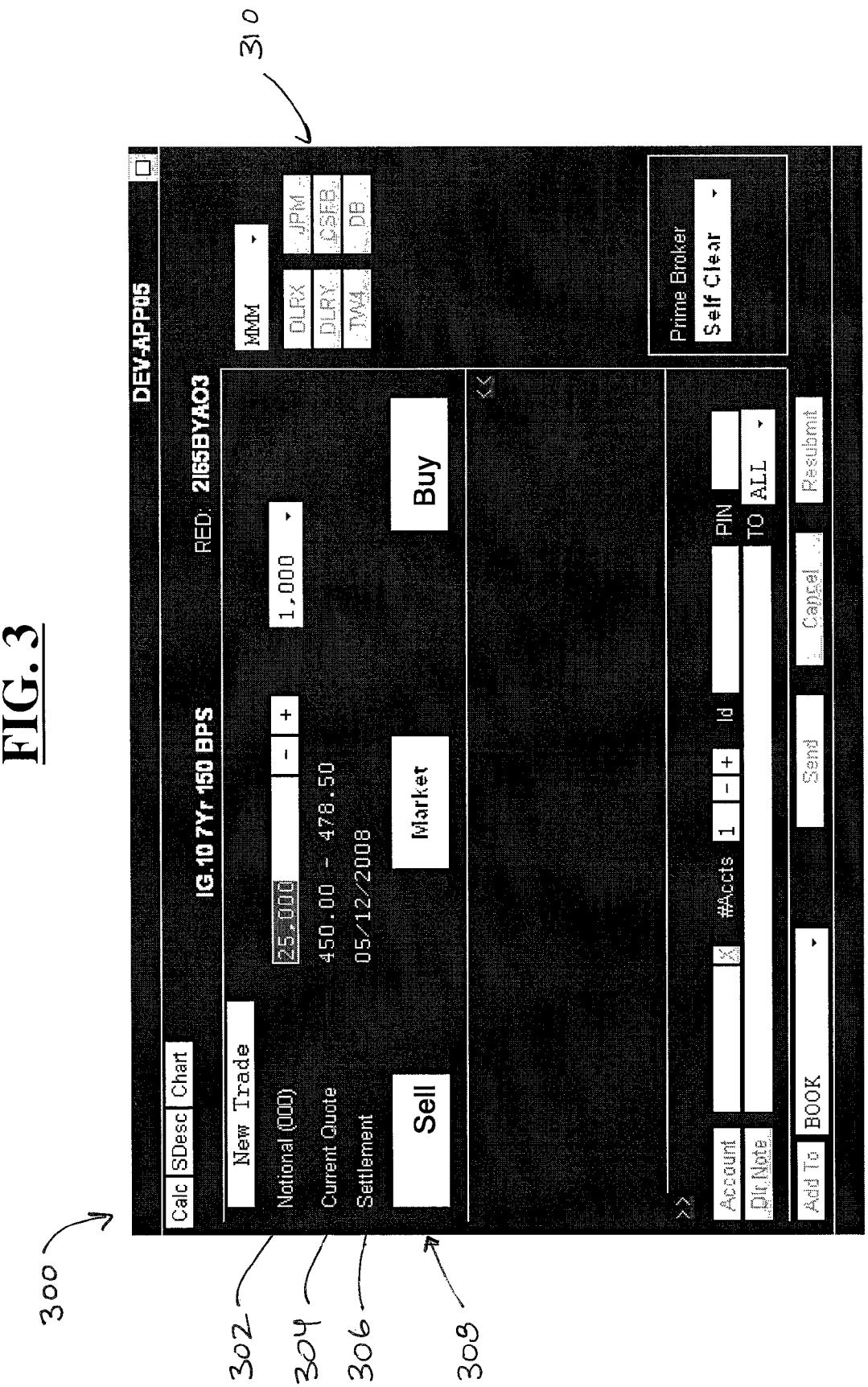
FIG. 3 is a graphical interface for requesting a quote or market in accordance with an embodiment of the invention.

With reference now to FIG. 3, there is shown and described an exemplary embodiment of a combined request for quote (RFQ) and request for market (RFM) trade ticket graphical user interface (GUI) 300. The RFQ/RFM ticket GUI 300 is shown by way of example in "market mode." In RFM mode, the current quote shows a bid and offer spread. In a preferred embodiment, no economics are initially displayed. Clicking the BID quote will compute economics based on BID price (Sell). Clicking the OFFER quote will compute economics based on Offer price (Buy). In the RFM mode, the user selects a single dealer. Thus, if a user chooses a second dealer after a first is selected, will cause the selection of the first dealer to turn OFF and the second dealer selection will be turned ON. In RFQ mode, the current quote also shows a bid and offer spread. Similarly, economics are displayed as the direction of the selected side. Moreover, in RFQ mode, multiple dealers may be selected; however, if the MARKET button is selected after more than one dealer is selected, all dealers will be deselected and the user must then select a single dealer. In RFQ mode, a label (not shown), will show the type of trade, such as "You BUY Protection" or "You Sell Protection" depending on the nature of the RFQ.

Table 1 below depicts preferred protocols for the RFM process:

TABLE 1

| RMF Protocol Summary | Individual |
|---|---|
| # Simultaneous Trades | 1 |
| Max Dealers | 1 |
| Trade Session Limit | Unlimited |
| Minimum Increment | 1 MM |
| Minimum Dealer OTW | 0 Sec |
| Maximum Dealer OTW | 30 Sec |
| Trade Types Supported | Outright |
| Price updates/Sec | 1/sec |
| Initial Dealer Response Timeout | 60 sec |
| Initial Customer Response Timeout | 30 sec |
| Customer Counter? | Yes |
| Dealer Counter? | Yes |
| Can dealer quote smaller size than requested? | Yes |
| Can customer execute smaller size than requested? | No, only if dealer shows sizes smaller than requested. |
| Dealer can improve/fade levels? | Yes |
| Dealer Has Last Look? | Yes |

It will be understood by persons of skill in the art that the above protocols can be modified within the spirit of the present invention to address specific design considerations or to meet specified objectives.

To seek a market from the dealer, the customer selects the "market" button and enters a notional amount for the requested trade on the RFQ/RFM ticket GUI 300 in FIG. 3. The RFQ/RFM ticket GUI 300 already shows the selected financial instrument based on a prior selection made by the customer (not shown). The RFQ/RFM ticket GUI 300 preferably includes at least one of a notional input field 302, a current quote field 304, a settlement date field 306, trade type selection buttons 308, and a dealer selection field 310.

Figure 3A:
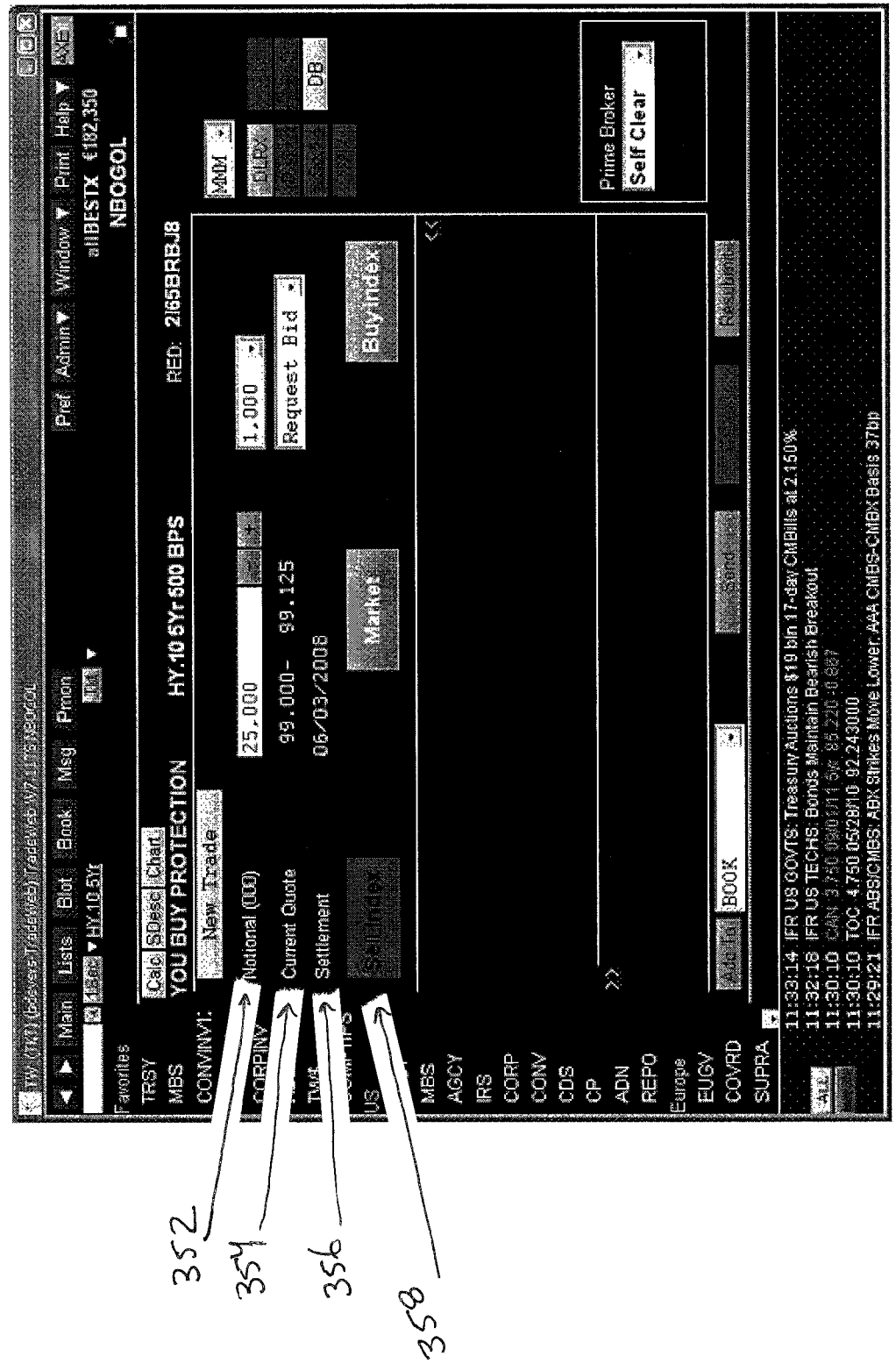
FIG. 3a is an alternate view of a graphical interface for requesting a quote or market in accordance with an embodiment of the invention.

FIG. 3a depicts an exemplary embodiment of a high yield ticket GUI 350, which also includes at least one of a notional input field 352, a current quote field 354, a settlement date field 356, trade type selection buttons 358, and a dealer selection field 360.

Figure 4:
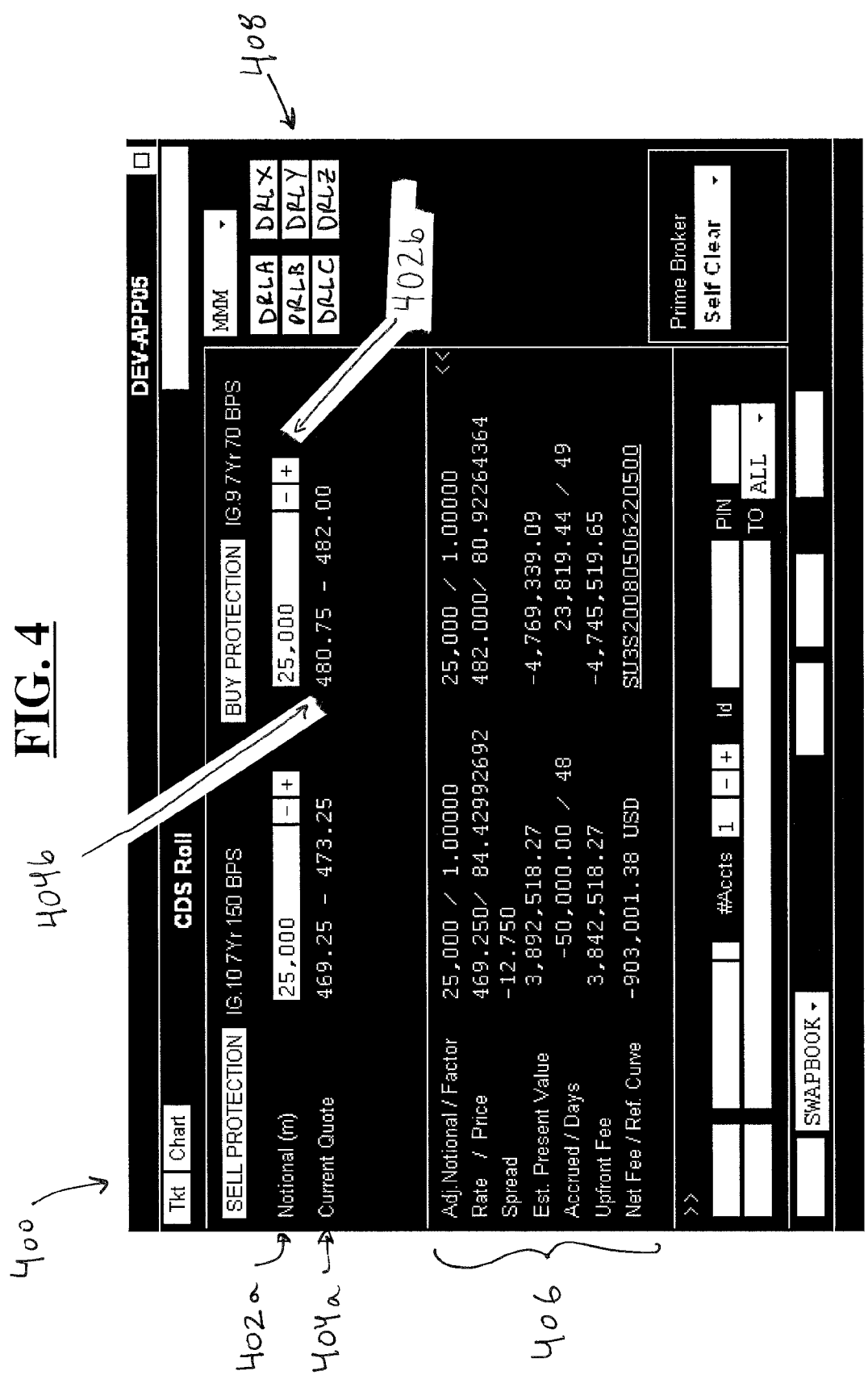
FIG. 4 is a graphical interface for negotiating a CDS roll in accordance with an embodiment of the invention.

In FIG. 4, an exemplary embodiment of a RFQ Roll ticket GUI 400 is shown. The RFQ Roll ticket GUI 400 preferably includes at least one of notional input fields 402a and 402b for each of a sell protection and buy protection side, current quote field 404a and 404b for each of a sell protection and buy protection side, an economics display field 406, and a dealer selection field 408. The economics display field 406 may include information related to or displaying an adjusted notional/factor, a rate/price, a spread, an estimated present value, an accrued amount and number of days, an upfront fee, and a net free/reference curve. If the customer is buying the roll, then the customer is essentially buying the new index and selling the current index. If the customer is selling the roll, then the customer is essentially selling the new index and buying the current index.

Table 2 below describes a preferred embodiment of the features and operation of RFQ Roll ticket GUI 400:

TABLE 2

| If the user clicks BUY or SELL, the ticket will update the labels to reflect the direction. | The LONGER maturity financial instrument is positioned on the left The SHORTER maturity financial instrument is position on the right |
|---|---|
| "BUY Roll" | Customer is BUYING the new index Customer is SELLING the current index |
| "SELL Roll" | Customer is SELLING the new index Customer is BUYING the current |
| RFQ Mode | |
| Current quote shows Bid & Offer | If BUY is selected, the screen will reflect "Buying the Roll" which is buying the new contract and selling the current. If SELL is selected, the screen will reflect "Selling the Roll" which is selling the new and buying the current |
| "Buy Protection" & "Sell Protection" labels will display accordingly Economics display as they currently do (direction of the selected side) | |
| User can choose to hide the following sections | Economics Notes/Accounts |
| If user hides on a section on the ticket, the preference will be updated so that the next ticket wakes up the same way | |

Figure 5:
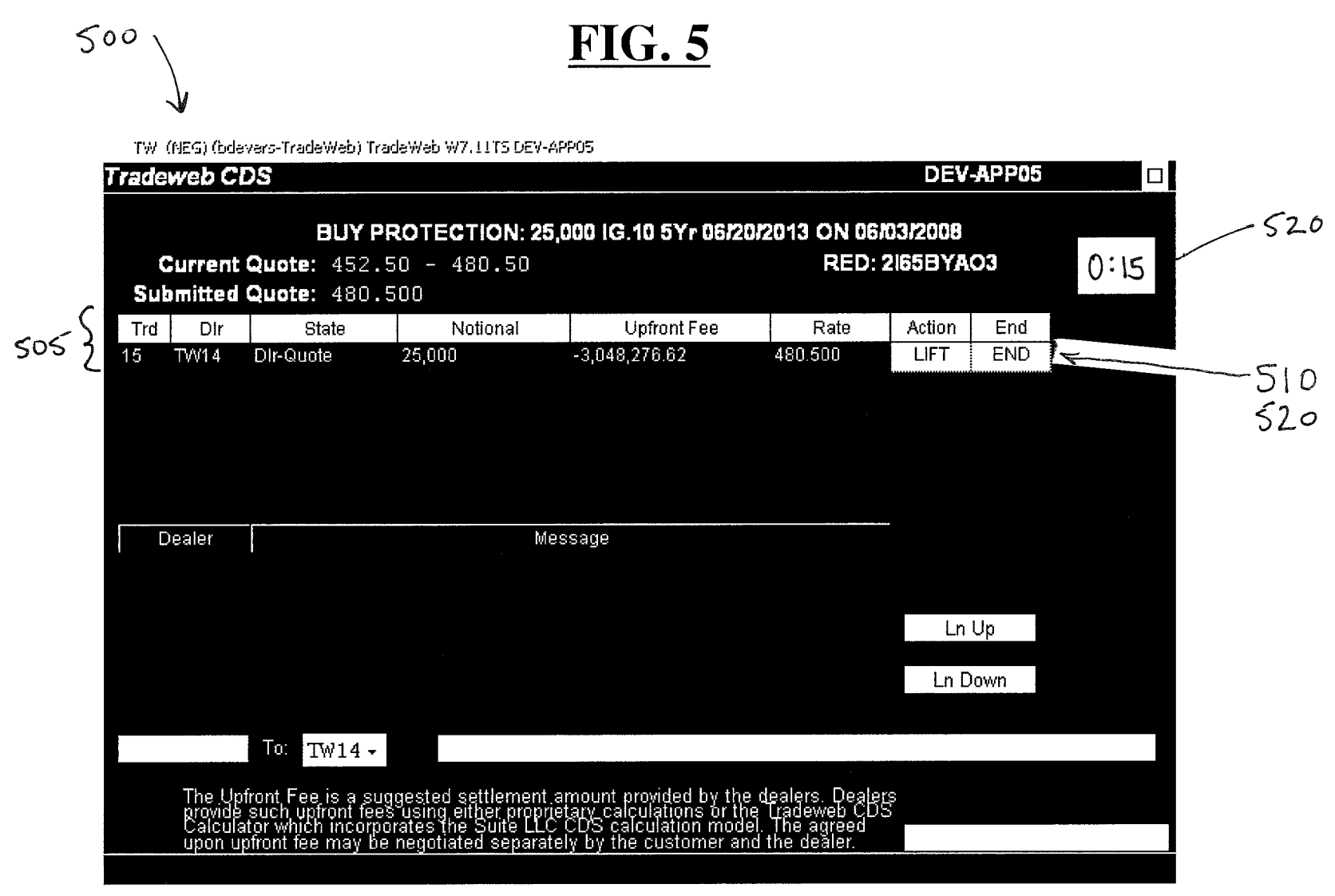

FIG. 5 depicts an exemplary embodiment of a RFQ negotiation GUI 500 in which a customer reviews the dealer quote as indicated in line item 505 and has the option to lift (as shown) or hit (not shown) the quote using button 510 or end the trade negotiation phase using button 515. A counter 520 counts down the amount of time available to the customer to make a decision on the dealer quote.

If a market is requested using RFQ/RFM ticket GUI 300, then the Request for Market routine as shown and described in connection with FIG. 2 is initiated. In a preferred embodiment, once a market request is submitted, on the dealer's computer, a Dealer Market Response GUI 600, such as is shown in FIG. 6, depicts the customer's market request and permits the dealer to enter bid-ask prices for the selected financial instrument. The dealer can be given the option to send the bid-ask prices as "send subject" or "send firm" prices. "Send subject" provides the dealer with a last look option after a customer accepts a bid or ask price to execute a trade. "Send Firm" will cause a trade to be executed upon acceptance by the customer.

Figure 7A:
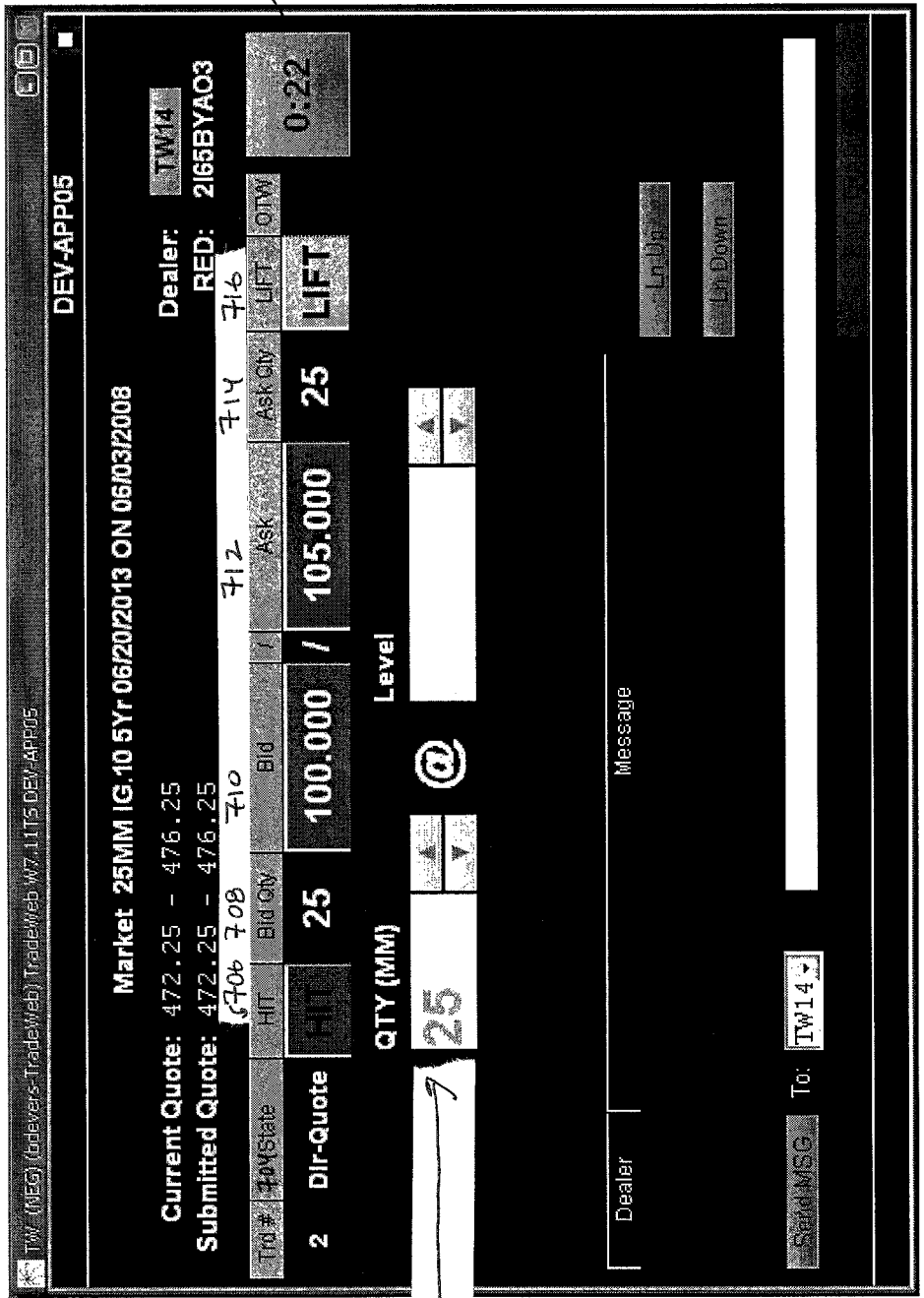
FIG. 7a is a graphical interface for reviewing a dealer quote in accordance with an embodiment of the invention.

Once the dealer enters a bid-ask price and sends to the customer, the customer is presented with a Trade Negotiation GUI 700, as shown in FIG. 7a, which permits the customer to accept a trade either to buy or sell at the dealer's prices, or to counter the trade. Using the GUI 700, the customer can either "hit" the bid and sell the financial instrument or lift the "ask" and purchase the financial instrument depending on the nature of the trade being negotiated. Trade Negotiation GUI 700 is shown in the pre-execution stage and preferably includes at least one of trade number field 702, a trade state field 704, a hit at bid button 706, a bid quantity field 708, a bid level field 710, an ask level field 712, an ask quantity field 714, a lift at ask button 716, a trade counter 718, and a counter section 720.

Table 3 below depicts a preferred set of general RFM Negotiation Details:

TABLE 3

Figure 7B:
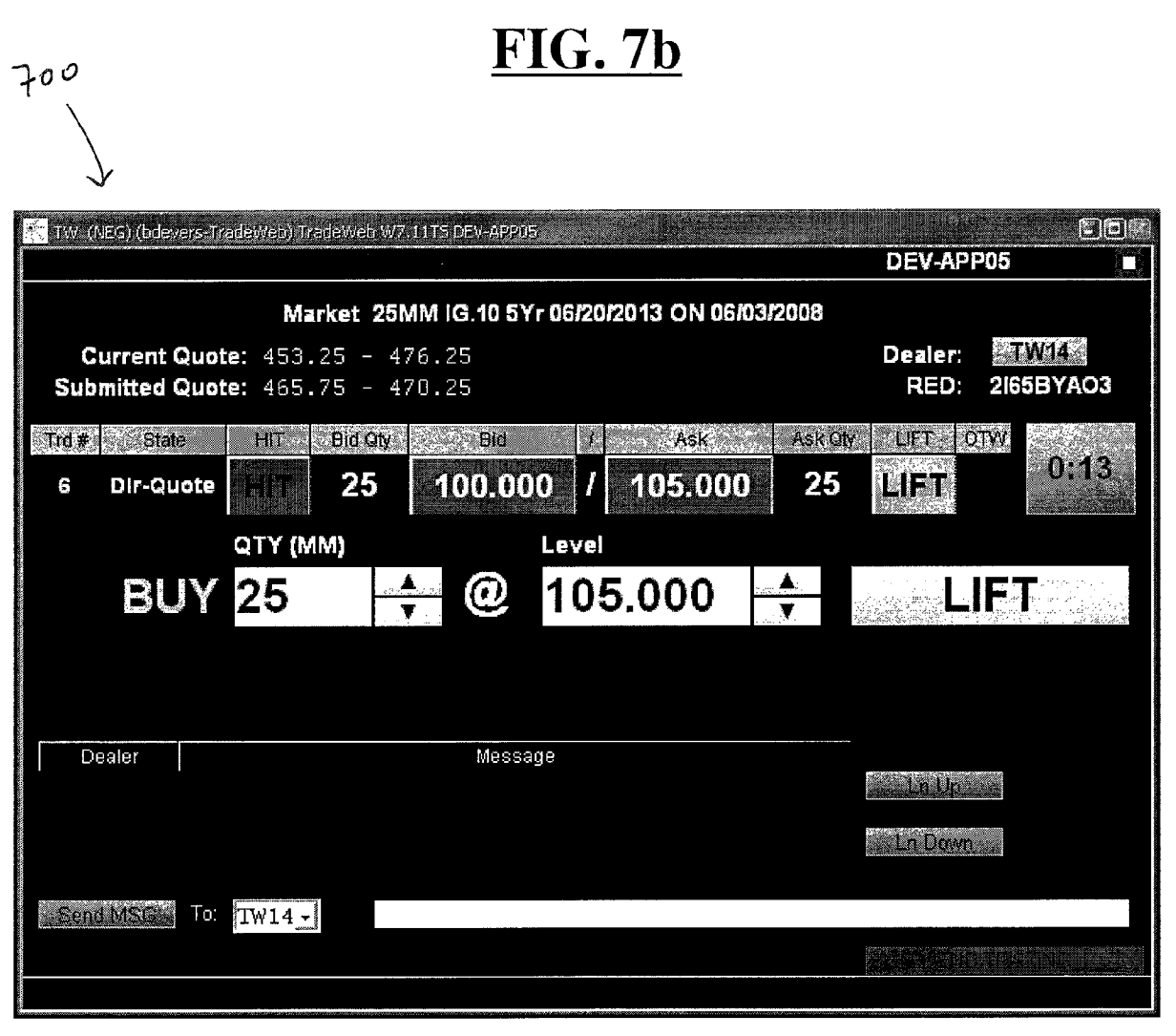

Top Section
Request
Market: Size (MM) Description
Current Quote:
Submitted Quote:
RED
Trade Date
Quote Section
Counterparty: XYZ
Quote Table
Trade #
State
Hit
Bid Qty
Bid
"f" - Separator
Ask
Ask Qty
Lift
Session Time
Ticket Section
Confirm Button
Submits the requested trade
Displays the customers intended trade
LIFT, Quantity @Price
Background GREEN
HIT, Quantity @Price
Background RED
Counter: BUY, Quantity @Price
Background Yellow
Counter: SELL, Quantity @Price
Background Yellow
Size & Price Fields
Clicking the BID or OFFER price fills in the dealer price and customer size
Clicking the BID or OFFER size fills in both price and size In FIG. 7b, there is shown a state of Trade Negotiation GUI 700 in which the LIFT button has been pressed an the customer has selected to purchase the financial instrument at the dealer's ask price.

FIG. 7c depicts the state of Trade Negotiation GUI 700 following the outright lifting of the dealers ask quote and indicates that the customer "Bought Protection 25MM IG.10 5Yr 06/20/2013 on 06/03/2008."

Figure 7D:
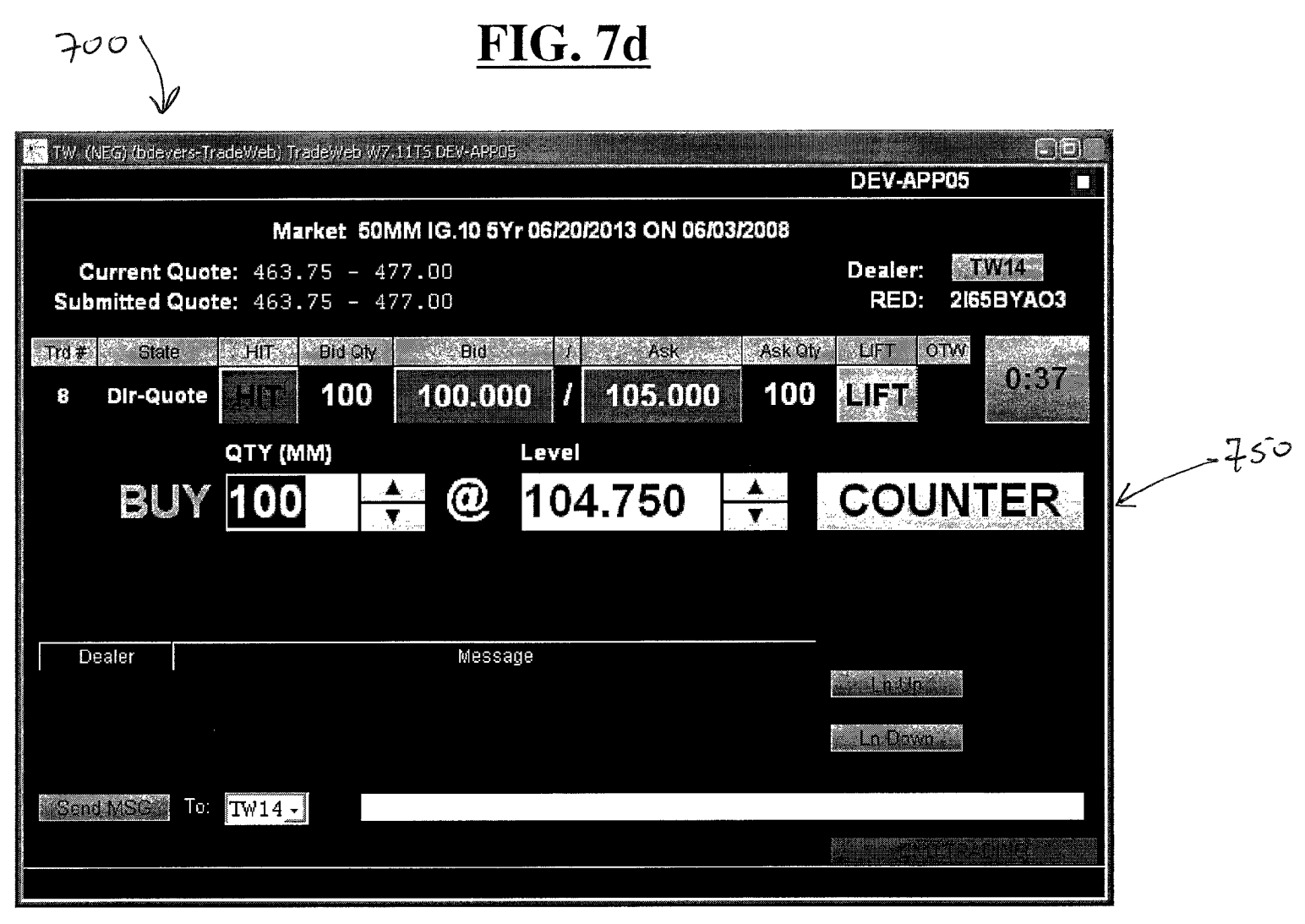

Using counter section 720 of GUI 700, if the customer desires to counter, he/she can enter a new price in the "@ Level" field. FIG. 7d shows the Trade Negotiation GUI 700 in a state wherein a counter has been entered by a customer. By pressing the COUNTER button 750, the counter will be transmitted to the dealer computer 30 through the centralized computer system 15.

In order to provide protection to the customer, certain preferred parameters may be put in place to control the countering process. For example, when the customer is countering the buy side of the trade, the ask price can only be toggled lower. Similarly, when the customer is countering the sell side of the trade, the bid price can only be toggled higher.

In a counter situation, the customer sends a firm request to the dealer indicating the price and quantity he is willing to buy or sell. In this protocol, the quantity can be changed but is still bound by the dealer maximum size. On screen, a counter is initiated by modifying the price field to any value other than the dealers' bid or offer price. When in counter mode, the SUBMIT/CANCEL buttons will be replaced by a COUNTER button. The sequences of screen shots included herein illustrate what appears on the customer and dealer side during a counter. In a preferred embodiment, as the dealer and customer counter, the previous quotes are cleared from their respective cells. For example, if a customer counters an offer and the dealer re-offers at a new price, the new price shows up in the ASK field on the negotiation screen.

Figure 8A:
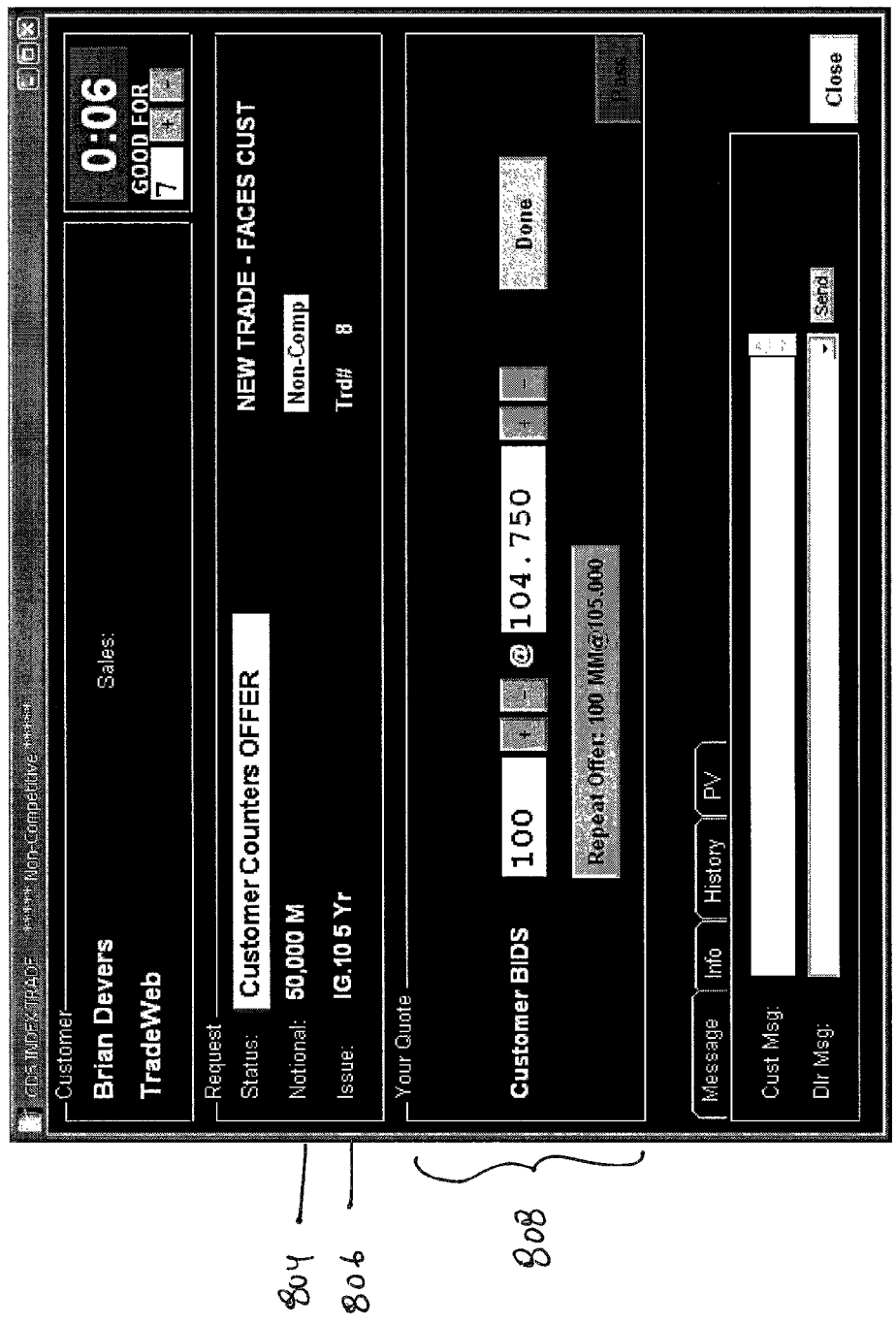
FIG. 8a is a graphical interface for reviewing a customer counter in accordance with an embodiment of the invention.

When a trade is countered, the dealer receives the Dealer Side Counter GUI 800, as shown in FIG. 8a. GUI 800 preferably includes at least a counter indicator 802, a notional field 804, an issue indicator 806, and a quoting field 808. If the dealer decides to re-quote the trade, then, as shown in FIG. 8b, the dealer can either repeat the previous offer, execute a trade at the counter price, counter the counteroffer, or pass. To counter the counteroffer, the dealer can adjust the trade using the "+/−" toggle buttons 820, 822 next to the amount and price. The dealer can send the counter subject or firm as with the initial trade.

Figure 9:
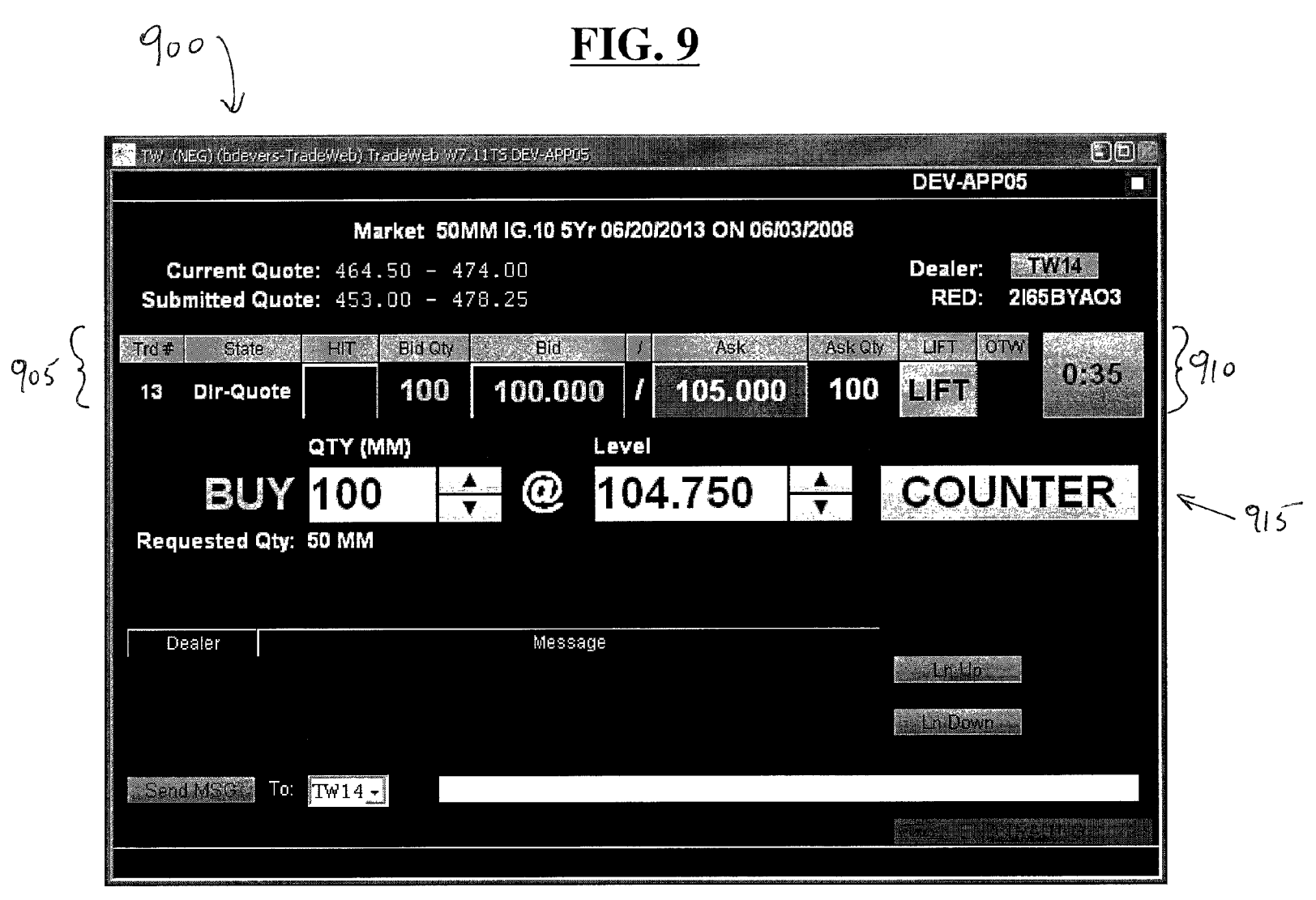

FIG. 9 depicts the Trade Negotiation GUI 900 in a state after the dealer submits a new quote in response to a customer counter. The GUI 900 shows the new quote 905 and a new clock counter 910, along with the customer's original counter information 915.

Figure 10:
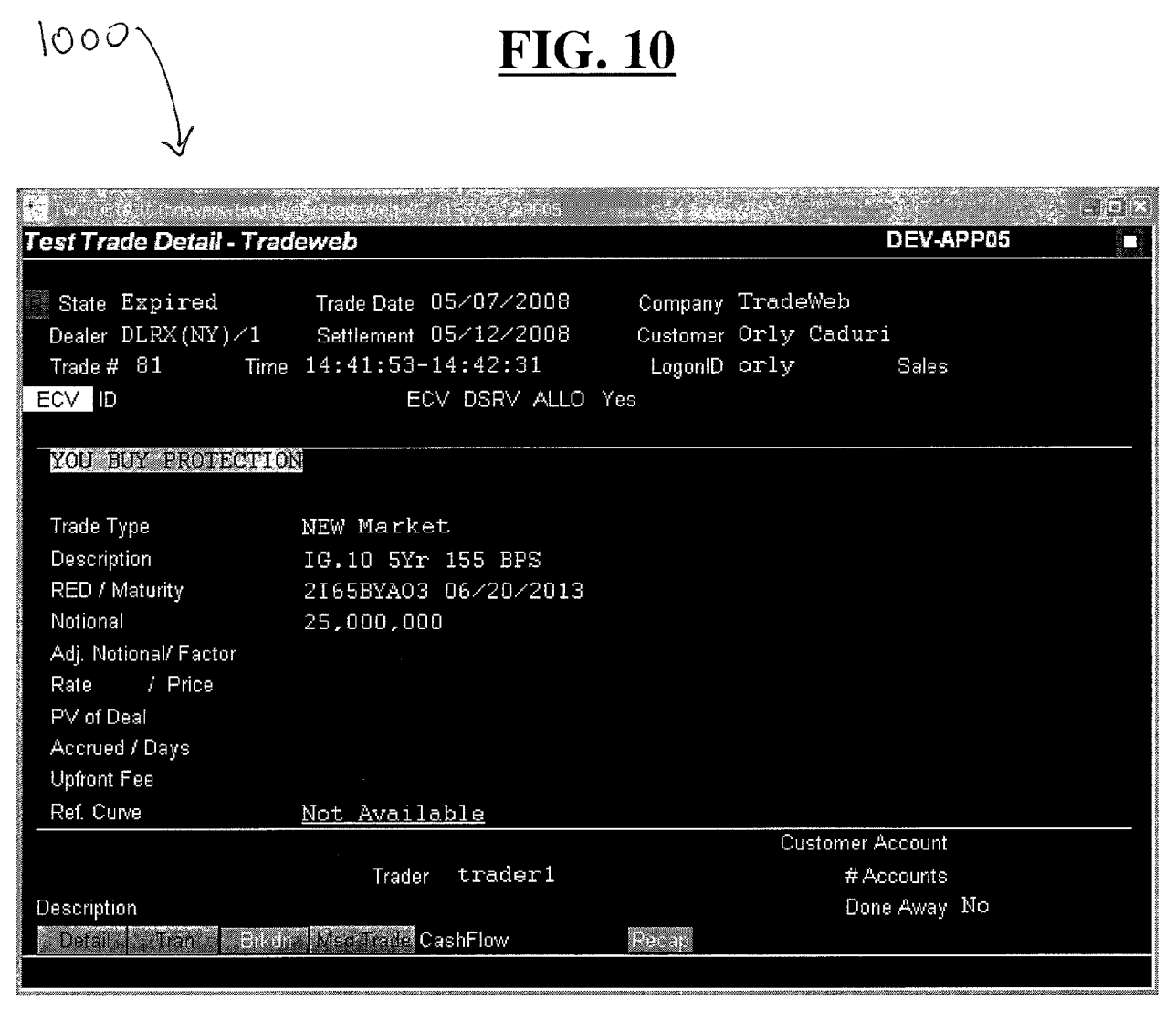

FIG. 10 shows a Trade Detail GUI 1000 in which various trade details related to a particular trade can be displayed. These details will also be preferably stored in database 18 of centralized computer system 15 in an account designated for the customer.

In a preferred embodiment, specialized color schemes can be used to signify whether a price during a counter or re-quoting scenario has changed for better or worse. For example, if a new price is better than the old or original price, then the price can be programmed to flash green. Alternatively, if the price is worse, then the price can be programmed to flash red.

Table 4 below lists a transaction log for the trade negotiation illustrated above in connection with FIGS. 7-9. This transaction log is preferably stored in a trade history database (not shown) as part of database 18 of centralized computer system 15.

TABLE 4

| TIME | DETAIL |
|---|---|
| | CUSTOMER COUNTER |
| 9:07:16 | Trade sent: Market 25,000 IG.10 Comp: 408.00/410.00 |
| 9:07:16 | Comp: 408.00/410.00 |
| 9:07:16 | Trade received by Dealer |
| 9:07:16 | Dealer Quote: 410.5/412.5 25,000 × 50,000 Subject |
| 9:07:16 | Quote Received by Customer: 410.5/412.5 25,000 × 50,000 Subject |
| 9:07:16 | Customer counter: BUY 25,000 @ 411.00 |
| 9:07:16 | Counter received by dealer |
| 9:07:16 | Dealer accepts counter |
| 9:07:16 | Dealer response received by Customer |
| 9:07:16 | Trade Confirmation Sent |
| 9:07:16 | Comp: 408.00/410.00 |
| 9:07:26 | Dealer ACCEPT received by Customer |
| | DEALER RE-COUNTER |
| 9:07:16 | Trade sent: Market 25,000 IG.10 Comp: 408.00/410.00 |
| 9:07:16 | Comp: 408.00/410.00 |
| 9:07:16 | Trade received by Dealer |
| 9:07:16 | Dealer Quote: 410.5/412.5 25,000 × 50,000 Subject |
| 9:07:16 | Quote Received by Customer: 410.5/412.5 25,000 × 50,000 Subject |
| 9:07:16 | Customer counter: BUY 25,000 @ 411.00 |
| 9:07:16 | Counter received by dealer |
| 9:07:16 | Quote Updated by dealer: Offer 25,000 @ 412 |

TABLE 4-continued

| TIME | DETAIL |
|---|---|
| 9:07:16 | Dealer quote update received by Customer |
| 9:07:16 | Customer LIFTS offer: 25,000 @ 412.5 |
| 9:07:16 | Comp: 408.00/410.00 |
| 9:07:16 | Customer response received by dealer |
| 9:07:16 | Dealer ACCEPTS trade |
| 9:07:16 | Dealer response received by Customer |
| 9:07:16 | Trade Confirmation Sent |
| 9:07:16 | Comp: 408.00/410.00 |
| 9:07:16 | Dealer ACCEPT received by Customer |
| 9:07:16 | Trade confirmation received by Dealer |

It should be noted that references herein to phrases such as "one embodiment" or "an embodiment" means that a particular feature, structure or characteristic described in connection with the embodiment is included in at least one embodiment of the invention. The phrases such as "in one embodiment" or "in certain embodiments" in various places in the specification are not necessarily, but can be, referring to the same embodiment. Use of the term "preferred" or "preferably" is intended to indicate a configuration, set-up, feature, process, or alternative that may be perceived by the inventor(s) hereof, as of the filing date, to constitute the best, or at least a better, alternative to other such configurations, set-ups, features, processes, or alternatives. In no way shall the use of the term "preferred" or "preferably" be deemed to limit the scope of the claims hereof to any particular configuration, set-up, feature, process, or alternative.

It will be further appreciated by those skilled in the art that the figures are purely illustrative, and that the system may be implemented in any number of ways, by the actual designers, as long as the functionality, relating to the trading in financial instruments through a system that assists in identifying users that are likely to be on opposite sides of a transaction, stays intact.

While there have been shown and described fundamental novel features of the invention as applied to the exemplary embodiments thereof, it will be understood that omissions and substitutions and changes in the form and details of the disclosed invention may be made by those skilled in the art without departing from the spirit of the invention.

The invention claimed is:

1. A computer-implemented method for trading a derivative using a computer system capable of communication with a customer computer and a plurality of dealer computers, the method comprising:
  providing information from the computer system relating to a plurality of derivatives;
  causing the display on the customer computer a trade request ticket interface, the trade request ticket interface designed and configured to receive one or more inputs related to a trade request;
  receiving from the customer computer a trade request and an indication of at least one dealer to which the trade request is directed;
  transmitting the trade request to the selected at least one dealer;
  causing the display on the dealer computer a trade quote interface, the trade quote interface designed and configured to receive one or more inputs related to a dealer quote in response to the trade request;
  transmitting the trade quote to the customer computer;
  causing the display on the customer computer a trade negotiation interface, the trade negotiation interface designed and configured to enable inputs related to hitting or lifting of the dealer quote and inputs countering the dealer quote;
  if the dealer quote is countered,
    transmitting a counter to the selected at least one dealer;
    causing the display on the dealer computer the trade quote interface in a counter state, the trade quote interface in the counter state designed and configured to enable the dealer to accept the counter, re-quote, or end the trade request; and
  if the dealer quote is hit or lifted by the customer or the dealer accepts the counter, executing a transaction on a computer for the derivative.

2. A non-transitory computer program product, comprising a computer usable medium having a computer readable program code embodied therein, said computer readable program code adapted to be executed to implement a method for trading a financial instrument, said method comprising:
  providing a system, wherein the system comprises distinct software modules, and wherein the distinct software modules comprise a request for market module programmed with a trade negotiation sub-component to handle the exchange of messages related to the negotiation of trades, and a trade execution module;
  causing the display on a customer computer a trade request ticket interface, the trade request ticket interface designed and configured to receive one or more inputs related to a trade request and transmitting the trade request to a dealer computer, and wherein the display and transmitting is processed by the request for market module;
  causing the display on the dealer computer a trade quote interface, the trade quote interface designed and configured to receive one or more inputs related to a dealer quote in response to the trade request and transmitting the trade quote to the customer computer to be displayed on a trade negotiation interface on the customer computer, the trade negotiation interface designed and configured to enable inputs related to hitting or lifting of the dealer quote and inputs countering the dealer quote, and wherein the display, transmitting, and trade negotiation interface is processed by the trade negotiation sub-component of the request for market module;
  if the dealer quote is countered, then
    transmitting a counter to the selected at least one dealer;
    causing the display on the dealer computer the trade quote interface in a counter state, the trade quote interface in the counter state designed and configured to enable the dealer to accept the counter, re-quote, or end the trade request; and
  if the dealer quote is hit or lifted by the customer or the dealer accepts the counter, executing a transaction for the derivative using the execution module.

3. A computerized electronic trading system designed and adapted to permit a customer using a customer computer to electronically request a market from a dealer using a dealer computer for a financial instrument; the computerized electronic trading system communicatively connected to a network to be in electronic communication with the customer computer and the dealer computer; the computerized electronic trading system comprising:
  a centralized computer system including one or more computers and including at least one message server for communicating electronic messages between the customer computer and the dealer computer,
  a database system including at least one storage device, the database system storing at least information related to a plurality of financial instruments and to a trade executed between the customer and dealer;

wherein, the computerized electronic trading system is programmed with a request for market module programmed with a trade negotiation sub-component to handle the exchange of messages related to the negotiation of trades, and a trade execution module; and wherein, using the trade negotiation sub-component of the request for market module, electronic messages related to a selection and pricing of the financial instrument, including an ability to counter a price quote for the financial instrument are transmitted through the computerized electronic trading system, and, using the execution module, a trade for the financial instrument is executed upon agreement between the customer and the dealer on the price quote.

* * * * *